Dec. 25, 1934.  C. R. SKINNER  1,985,584
SOUND RECORDING SYSTEM
Filed March 27, 1931
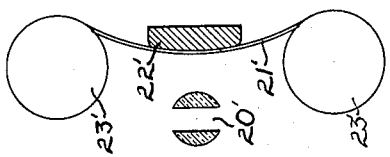
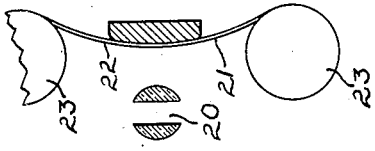
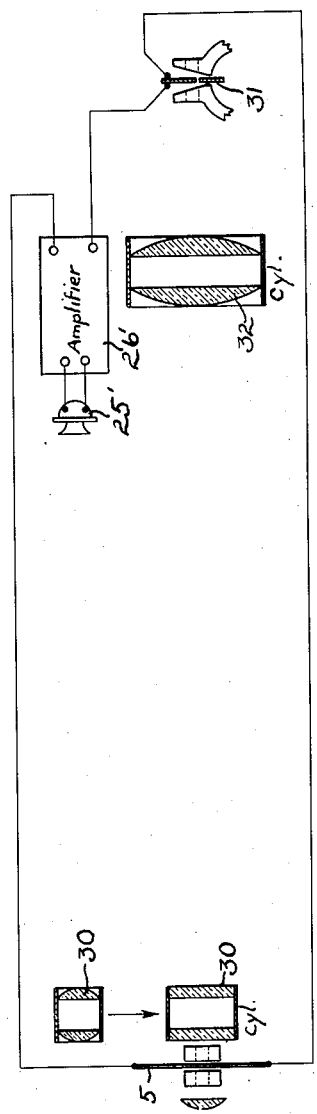
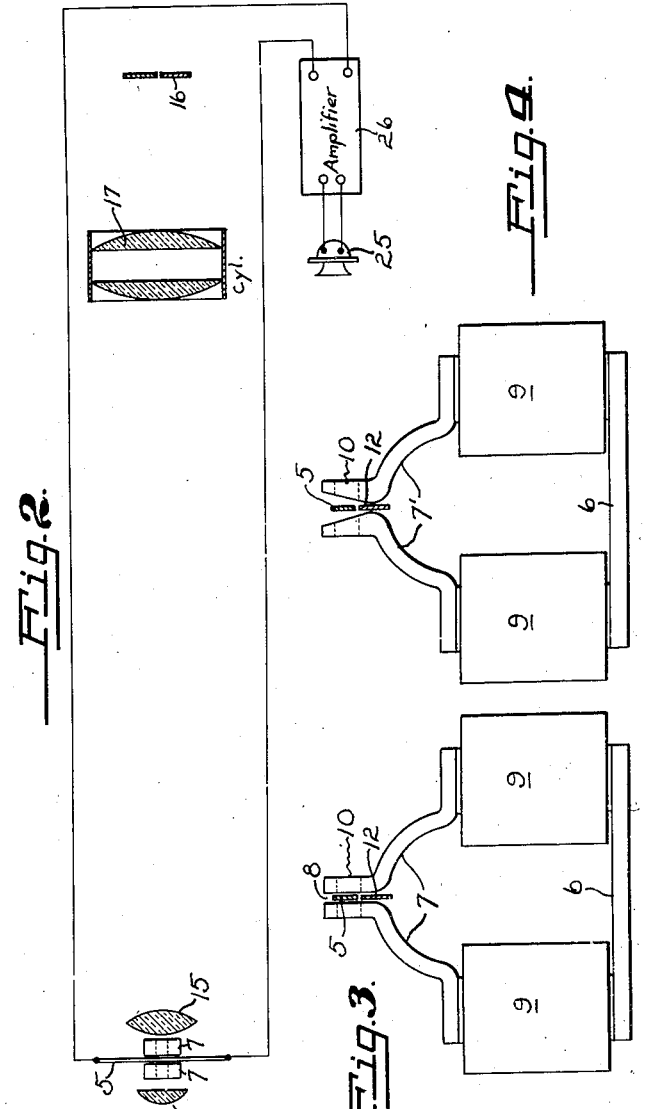
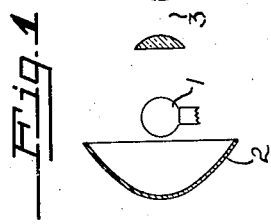
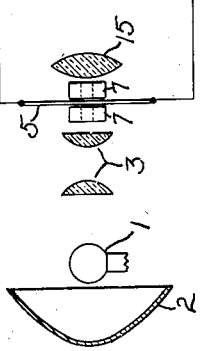
INVENTOR,
CLIFTON R. SKINNER.
BY Donald K. Lippincott
ATTORNEY.

Patented Dec. 25, 1934

1,985,584

UNITED STATES PATENT OFFICE

REISSUED 1,985,584

SOUND RECORDING SYSTEM

Clifton R. Skinner, Palo Alto, Calif.

Application March 27, 1931, Serial No. 525,670

10 Claims. (Cl. 179—100.3)

My invention relates to systems for recording sound upon photographic film, and particularly to systems wherein the width of the track produced by projecting a linear image upon the film is varied to produce a recording of the so-called "variable area" type.

Among the objects of my invention are: First, to provide a system wherein the simple and rugged ribbon galvanometer may be used to produce variable area recording; second, to provide an optical system having a plurality of foci at different distances from the plane of the film, whereby a plurality of light modulating elements may be arranged so that each element casts a clearly cut image upon the film, without interference between the elements themselves; third, to provide a substantially distortionless system combining the advantages of variable area and variable density sound recording; fourth, to provide an optical system for recording sound on film wherein the usual diaphragm having a linear opening, or "slit" may be dispensed with if desired, thus providing a maximum of illumination reaching the film; and fifth, to provide a modulator having a non-linear response to voice currents, so that if two of these modulators in turn act upon the light passing through the system, the resulting modulation will be linear in character.

Other objects or advantages of my invention will become apparent, or will be specifically described, in the course of this specification.

Referring to the drawing:

Figure 1 is a schematic diagram of an optical system embodying my invention, wherein two light modulators are used.

Figure 2 is also a schematic diagram, and illustrates a modified form of optical system, embodying a single light modulator.

Figure 3 is a semi-diagrammatic showing of a ribbon galvanometer adapted for use as a light modulator in connection with this invention.

Figure 4 is a similar showing of a light modulator modified to produce a non-linear response to voice currents.

The recording of a sound track upon a moving picture film is ordinarily accomplished by one of two generally recognized methods. Both of these methods operate by varying the amount of light from a suitable source which falls upon each longitudinal elementary area of the track.

In the first, or variable density method, a uniform amount of light falls upon the entire width of the track, but a light valve or some other method of modulation varies the light flux reaching the track in such a manner that bands of varying light transmission are produced upon the film, these bands grading from light to dark and vice versa in time with the sound wave to be recorded.

In the second, or variable area method, the light track is divided sharply into two sides, one of which is completely exposed, while the other is unexposed. The light reaching the illuminated portion of the film is uniform in intensity, but the illuminated portion varies in width in accordance with the sound impulses.

A third method has been proposed, combining these two systems. It has been believed by some inventors that such a combination would double the range in intensity recorded. This is a fallacy, since either method alone will give variations ranging between the maximum transmission of unexposed film and complete darkening of the film, and the combination of the two methods could do no more than this upon a sound track of given width. Moreover, if two modulators which are linearly responsive to the current flowing through them are arranged to operate in succession, the resultant modulation will be in accordance with the square of the instantaneous current flowing. For low percentages of modulation this will introduce no appreciable distortion, but with high percentages of modulation, the distortion produced by this system becomes very severe. This distortion takes the form of an undesired second harmonic in the reproduced wave.

Each of the two first mentioned methods of recording has certain advantages, and each tends to produce certain characteristic types of distortion. The variable density method utilizes a light modulator embodying a form of Einthoven ribbon or "string" galvanometer, which is a relatively rugged and simple piece of apparatus, whereas it has been customary to use a vibrating mirror type of galvanometer to produce modulation by the variable area method. The latter instrument is much more delicate and subject to vibrations in its own period than is the ribbon galvanometer.

On the other hand, in order that accurate recordings may be made, the variable density system requires that the film be developed with extreme accuracy, in order that the exposures may fall within the range where the photographic emulsions respond linearly to exposure. The variable area recordings may be developed much less accurately, since there are no degrees of shading to be reproduced, the track being half dark and half light.

In both systems of recording, "back-ground noise", or undesired sound due to imperfections in the track, is important. This back-ground noise becomes greater the longer the film is used, a portion of it being traceable to accumulation of dust on the film, scratches, etc. Since few such acquired imperfections extend across the entire width of the sound track, they are of less intensity in the variable density track than in the variable area. Thus a small fleck of dust offers maximum contrast against the light portion of a variable area film, and much lower contrast against the shaded variable density film. Conversely, a scratch upon the film gives maximum contrast against the dense portion of the variable area track, and a much less contrast against the shaded variable density track. These back-ground noises are of importance only when the percentage of modulation is small; with a fully modulated track the energy in the recorded wave is so much greater than that in the imperfections that the back-ground noise is effectively drowned.

If a recording be made embodying both methods, certain advantages are therefore obtained; since but half of the modulation is carried by variations in density, a greater latitude in development is permissible, errors in development resulting only in second order distortions. Moreover, since none of the track on a positive print is completely clear with low percentages of modulation, the contrast offered by dust against the latter portion is not so intense as in variable area film, and hence the back-ground noise is reduced.

In accordance with this invention the principal advantages of both systems of recording may be realized. A ribbon galvanometer, or any other type of galvanometer movement having relatively small amplitude of motion, may be utilized to produce variable area recordings, thereby eliminating the expensive vibrating mirror device with its fragility and troublesome natural periods of vibration. Furthermore, double modulating systems may be used, each of the modulators being sharply in focus and functioning without interference with the other, to produce double modulation with linear response.

Broadly considered, this invention comprises a system of recording sound upon a moving film, wherein a galvanometer element, such as an Einthoven ribbon, is arranged for movement in a plane normal to the direction of movement of the film. A suitable light source is placed behind the galvanometer element, and an optical system interposed between the galvanometer and the film focuses an image of the element on the film which is enlarged in the direction of motion of the element.

The optical system is preferably arranged with an intermediate focus between the galvanometer element and the film; a diaphragm comprising a slit may be placed at this intermediate focus, with the result that as viewed from the plane of the film the diaphragm and galvanometer elements appear to lie in the same plane, a greater or less proportion of the slit being occulted by the galvanometer element, and with this arrangement a symmetrical optical system may be used which magnifies the image uniformly in all directions. This arrangement, however, results in a large waste of light, and I therefore prefer to utilize a cylindrical lens in the optical system which condenses the vertical dimension of the image upon the slit.

One of the best forms of the system comprises cylindrical lenses only, an objective positioned adjacent the galvanometer projecting a much enlarged image transverse to the motion of the element directly upon the film. A second cylindrical objective, arranged at right angles to that first mentioned, focuses a diminished image of the galvanometer in a plane between this second objective and the film, and the diaphragm, if any be used, is placed in the plane of this intermediate focus, a second cylindrical or spherical lens or lens combination between the intermediate focus and the film projecting the image of the diaphragm and galvanometer element on the film. With this particular combination, the diaphragm may be omitted entirely, or, in either modification in place of a fixed diaphragm, a second galvanometer element may be positioned perpendicularly to the first. This second element operates in the well known manner to vary the density of the track, while the first element varies the area. Where this arrangement is used, nonlinear galvanometer or modulator elements are preferable, and with the string galvanometer this non-linearity is preferably provided by making the air gap within which the ribbons move wedge-shaped, so that the magnetic field varies thereacross and the force tending to deflect the ribbon therefore varies not only with the current flowing in the ribbon, but also with the ribbon's position relative to the air gap.

A form of this invention which possesses its advantages in a high degree, is illustrated in Figure 2, wherein a light source, such as the concentrated filament bulb 1, and supplied with a suitable reflector or housing 2, furnishes the illumination for recording the sound upon the film. A condensing lens system 3, of conventional form, concentrates the light from the source upon the ribbon 5 of a suitable light modulator.

The use of string or ribbon galvanometers of various forms as light modulators is well known in the art, and the type shown in Figure 3 of the drawing is to be considered as illustrative merely. Such a modulator comprises a suitable magnetic core 6 having closely spaced pole-pieces 7 to provide an air gap 8, and excited by windings 9. An aperture 10 is formed through the pole-pieces, and the "string" or ribbon 5 is stretched through the air gap in such a manner as partly to obscure or occult the opening. In the particular form shown, the stationary ribbon or diaphragm 12 cooperates with the moving ribbon to define the edges of the opening.

A lens 15, shown as spherically bi-convex simple lens, but actually a properly corrected lens combination, is placed as closely as possible to the pole-pieces 7. This lens is of such focal length as to cast an image of the slot formed between the movable and fixed ribbons 5 and 12 respectively, in the plane of a diaphragm 16 which is situated a much greater distance from the lens 15 than is the light modulator slit. This diaphragm comprises a slit positioned in a plane perpendicular to the plane of the modulator ribbons. Owing to its much greater distance from the lens than that of the modulator, the image is greatly enlarged.

Between the lens 15 and the diaphragm 16 is a cylindrical lens or lens combination 17 mounted with its axis of curvature parallel to the slit in the diaphragm 16. Such a lens combination affects the paths of the light rays reaching it from the lens 15 in a vertical plane only, and has no effect upon the image cast by the lens 15 as regards its horizontal magnification. In a vertical plane, the cylindrical lens 17 becomes part of the combination with the lens 15, the two lenses together forming a combination of much shorter focal length and having an optical center intermediate the two lenses. This combination therefore throws an image in the plane of the diaphragm 16 which is much reduced in its vertical dimension instead of being enlarged as it is in its horizontal dimension. Hence, practically all of the light reaching the lens 15 from the modulator passes through the slit in the diaphragm 16, the condensation in the vertical direction compensating for the rarefaction in the horizontal direction.

Another lens combination 20 focuses the image formed in the plane of the diaphragm 16 upon the moving film 21, a suitable shoe or anvil 22 being placed behind the film in order to position it definitely in the plane of focus. The rollers or sprockets 23, guide the film over the shoe.

Sound currents from a microphone 25, magnified by the amplifier 26 of conventional type, are passed through the ribbon 5. The lateral movements of this ribbon, greatly magnified, are thrown in the plane of the diaphragm 16. The lens system 22 again focuses these movements on the plane of the film. Therefore, the band of light passing through the slit between the ribbons 5 and 12 and refocused eventually on the film 21 changes in width in accordance with the sound current and forms a sound track of the variable area type upon the film.

If the focus of the lens combination 15, 17 is sufficiently sharp, the diaphragm 16 can be omitted altogether, and the focus on the film will still be a narrow horizontal line of changing width which will produce a sound track of the same character as though the diaphragm had been included. On the other hand, the diaphragm 16 may be formed from the fixed and moving ribbons of a second light modulator as will be described more in detail in connection with the modification of the invention next to be described.

In this modification (Figure 1) the lamp 1, housing 2, and condensing lens 3, are arranged in the same general manner as in the first form to throw a parallel or slightly convergent beam of light upon the ribbon 5 of the modulator.

In this case, however, a cylindrical objective 30, mounted in the plane of the slit between the ribbons 5 and 12, is used to focus an image of the slit, (in-so-far as the horizontal dimensions are concerned) in the plane of a diaphragm 31 which is, in this case, shown as comprising the ribbon of a second light modulator. As in the previous case, this image is greatly enlarged in the direction of movement of the galvanometer element 5.

A second cylindrical lens 32 is mounted with its axis of curvature normal to the plane of the lens 30, and much nearer to the plane of the diaphragm 31 than to the plane of the galvanometer elements. This lens forms a second objective which throws a diminished image of the galvanometer elements and the slit between them in the plane of the diaphragm, this image affecting dimensions in the vertical plane only, and having no effect whatever upon the horizontal image cast by the lens 30.

The image in the plane of the diaphragm 31 is re-focused by the lens combination 20' upon the film 21' as in the case of the first form shown, the shoe 22' and rollers or sprockets 23' being diagrammatically indicated in this figure as before.

It is to be noted that the lens 20' may be either a cylindrical or a spherical combination. If it be cylindrical, however, the image of the galvanometer elements, cast by the lens 30, must be focused in the plane of the film 21', instead of being brought first to an intermediate focus in the plane of the diaphragm 31. I prefer to bring both horizontal and vertical images to the intermediate focus, but this point is relatively minor and either method will work satisfactorily.

Owing to the formation of this intermediate focus, the light modulator which comprises the diaphragm 31 can be mounted in this plane with an effect precisely the same as though it were mounted in the plane of the ribbon 5, but without any interference between the actual physical structures. Since the slot formed between the ribbons of the second modulator is normal to the movement of the film, its effect will be to vary the density of the track registered upon the film. The sound track produced by the two modulators will therefore vary both in area and in density.

If each of the two modulators were of the ordinary type, responding linearly to the current passed through them from the microphone 25' and amplifier 26', the final modulation produced would be proportional the square of the currents flowing instead of to their first power, and reproduction from the film would be seriously distorted by second harmonic currents when high percentages of modulation were used. It is therefore necessary, in double modulation, to use some method of compensation so that the resultant modulation will be linear.

This compensation may be secured in various ways; it may be produced electrically, in the amplifier 26' itself, so that its output currents are proportional to the square root of the microphone currents. It may be produced optically, by introducing diaphragm of proper form behind each modulator, so that the light passed thereby is proportional to the square root of the movement of the galvanometer elements. I prefer, however, to secure the compensation magnetically; and this may be done through the formation or configuration of the pole-pieces. The mathematics of this latter method are as follows, and from them the method of applying similar compensation in the other manners suggested may be readily deduced.

Let the maximum opening of each slit be taken as unity, and let X be the proportion of the slit unocculted by the galvanometer element by any instantaneous current $i$. Each modulator passes X times the light falling upon it, and for complete modulation X varies between zero and unity. Hence, if L is the total light falling upon the first modulator at full opening, the light passing through the second modulator is $LX^2$.

The light passed at $i=0$ must be one-half of the maximum, in order that positive and negative currents may give equal and opposite changes in total light flux and distortionless recording obtained. That is, the response of the modulators must be such as to satisfy the equation $$LX^2 = K(\tfrac{1}{2} + i) \qquad (1)$$

where K is a constant of proportionality. With suitable choice of units, $$X^2 = .5 + i, \text{ or } i = X^2 - .5 \qquad (2)$$

In a properly designed galvanometer or modulator, the deflection of the ribbon is directly proportional to the force producing it, and this force is $\phi i$, where $\phi$ is the magnetic flux through the ribbon. Hence, it is possible to design the pole-pieces of the modulator so that $\phi$ is a function of X which will give the proper deflection to satisfy the Equation (2).

From this equation, if $i=0$, $X=.707$. The deflection produced by a given current is therefore $$X-.707=\phi i \qquad (3)$$

constants of proportionality being neglected.
Substituting for $i$ from Equation (2)

$$X-.707=\phi(X^2-.5) \qquad (4)$$

Solving for $\phi$, this gives $$\phi=\frac{X-.707}{X^2-.5}=\frac{1}{X-.707} \qquad (5)$$

This is the equation of an hyperbola, $\phi$ varying between relative values or 2 for $X=0$, and $$\frac{1-.5}{.5}=.586 \text{ for } X=1$$

In a magnetic circuit of the type shown in the modulators illustrated in Figures 3 and 4, the entire reluctance in the circuit may be considered as in the air gap, without appreciable error. The flux through any elementary area of the gap is therefore inversely proportional to the length of the gap. Representing the length at any gap position corresponding to X by $g_x$, we may take $$1/g_x=\phi$$

and substituting this in Equation (5) we have $$1/g_x=\frac{1}{X+.707} \qquad (6)$$

or $g_x=X+.707$, the equation of a straight line. As X varies only between 0 and 1, $g_x$ varies between .707 and 1.707, or in the proportion 1:2.42.

Figure 4 shows the general form of the pole-pieces 7' required to give this result, the modulator being otherwise similar to that of Figure 3, and the parts thereof being designated by like reference characters.

Other methods of obtaining non-uniform flux may also be used. Thus, the hyperbola which represents the change in flux has not a very great curvature throughout its useful range, and may be approximated by a straight line change with but minor errors, producing only second order distortions. Hence, another method of compensation would be to mount the ribbon at the extreme edge of the pole-pieces, and projecting slightly from between them in the no-current position. The force per unit current will therefore decrease when the direction of deflection is such as to move the ribbons further from between the pole-pieces, and increase when the current flow is in the opposite direction. Stressing the ribbon to a point where the deflection is not proportional to the force producing it is another method whereby an extremely close approximation to the desired non-linear response may be obtained.

Neither is it necessary that the non-linearity of the two modulators be identical. Identical compensation is, however, to be preferred since this permits of minimum compensation in the most highly compensated modulator.

It will be realized that the general method of compensation which produces linear double modulations is applicable to any type of galvanometer element, and is by no means limited to the particular form here shown for illustrative purposes. Furthermore, different methods of compensation may be utilized in the two modulators. A non-linear slot may give one of the modulators its alinearity, while magnetic compensation is utilized in the other; or electrical methods of producing alinearity such as distorting amplifiers may be utilized for one while magnetic or optical compensation is utilized for the other.

It will therefore be understood that I do not limit myself to any of the exact combinations of elements illustrated in this application, since these elements may be re-combined in an almost unlimited number of permutations, and since other equivalent combinations will at once suggest themselves to those skilled in the art, and that I may adopt any form of the invention within the scope of the following claims.

I claim:

1. In a system for the photographic recording of sound on a moving record, a galvanometer comprising a moving element arranged to move normal to the direction of movement of said record, means for illuminating said element, a cylinder objective lens adapted to project an enlarged image of said element onto said record transverse to the motion of said element, a second cylindrical objective lens at right angles to said first-mentioned lens for forming a diminished image of said element at a focus intermediate said second lens and said record, a diaphragm positioned at said intermediate focus, and a third lens for projecting the combined images of said element and said diaphragm on said record.

2. In a system for the photographic recording of sound on a moving record, a galvanometer comprising a moving element arranged to move normal to the direction of movement of said record, means for illuminating said element, a cylindrical objective lens adapted to project an enlarged image of said element onto said record transverse to the motion of said element, a second cylindrical objective lens at right angles to said first-mentioned lens for forming a diminished image of said element at a focus intermediate said second lens and said record, a diaphragm positioned at said intermediate focus and having an opening therein whose maximum dimension is in a plane normal to the direction of movement of the film, and a third lens for projecting the combined images of said element and said diaphragm on said record.

3. In a system for recording a sound track upon a moving film, a galvanometer element non-linearly movable in a plane normal to the movement of the film, a lens system interposed between said element and said film and having conjugate foci in the plane of each and an intermediate focus therebetween, and a diaphragm positioned at said intermediate focus and having an opening therein whose maximum dimension is in a plane normal to the direction of movement of the film, said diaphragm being variable in opening to constitute a light modulator having a non-linear characteristic such that the light reaching the film is linearly modulated.

4. In a system for recording a sound track upon a moving film, a galvanometer element movable in a plane normal to the movement of the film, a cylindrical objective positioned adjacent said element for focusing an enlarged transverse image thereof on the film, and a second cylindrical optical element positioned in a plane normal to said objective and between said objective and the film for projecting a diminished longitudinal optical image of said galvanometer element in a plane between said last mentioned optical element and said film, a diaphragm in said image plane, and a lense for projecting a longitudinal image of said diaphragm on the film.

5. In a system for recording a sound track upon a moving film, an optical system having a focus in the plane of the film and at least two other focal planes, and dissimilar light modulators arranged in each of said planes, each of said modulators having a non-linear characteristic and cooperating to linearly modulate the light reaching the film.

6. In a system for recording a sound track upon a moving film, an optical system having a focus in the plane of the film and at least two other focal planes, and a variable area light modulator in one of said planes, a variable density light modulator in the other of said planes, each of said modulators having a non-linear characteristic to provide linear modulation of the illumination passed by both of the modulators.

7. In a system for recording a sound track upon a moving film, an optical system having a focus in the plane of the film and at least two other focal planes, and a variable area light modulator in one of said planes, a variable density light modulator in the other of said planes, each of said modulators having an operating characteristic such that I being the instantaneous current therethrough and X the percentage of maximum illumination through the modulator, X is proportional to $$\sqrt{\frac{I+1}{2}}$$

8. In a system for recording a sound track on a moving film, an optical system having a focus in the plane of the film and two foci conjugate thereto, a variable density light modulator arranged at one of said conjugate foci, and a variable area modulator arranged at the other of said conjugate foci, each of said modulators having a non-linear characteristic such that the light passing both modulators is linearly modulated.

9. In a system for recording a sound track on a moving film, an optical system having a focus in the plane of the film and two foci conjugate thereto, and a galvanometer ribbon arranged as a light modulator at each of said conjugate foci, said ribbons being arranged in perpendicular planes to provide concurrent variations in density and area of the sound track, each of said ribbons having a non-linear characteristic and cooperating to linearly modulate the light reaching the film.

10. In a system for recording a sound track on a moving film, a pair of light modulators arranged to vary concurrently the density and area of said sound track, each of said modulators having a non-linear response characteristic such that the resultant track is linearly modulated.

CLIFTON R. SKINNER.